US007026429B2

(12) United States Patent
Gertzmann et al.

(10) Patent No.: US 7,026,429 B2
(45) Date of Patent: *Apr. 11, 2006

(54) HYDROPHILIC POLYURETHANE-POLYUREA DISPERSIONS

(75) Inventors: Rolf Gertzmann, Leverkusen (DE); Christoph Gürtler, Köln (DE); Thorsten Rische, Unna (DE); Thomas Münzmay, Dormagen (DE)

(73) Assignee: Bayer Aktiengesellschaft, Leverkusen (DE)

( * ) Notice: Subject to any disclaimer, the term of this patent is extended or adjusted under 35 U.S.C. 154(b) by 5 days.

This patent is subject to a terminal disclaimer.

(21) Appl. No.: 10/738,452

(22) Filed: Dec. 17, 2003

(65) Prior Publication Data

US 2005/0176883 A1 Aug. 11, 2005

(30) Foreign Application Priority Data

Dec. 20, 2002 (DE) ................. 102 60 270

(51) Int. Cl.
*C08G 18/10* (2006.01)
(52) U.S. Cl. .................. 528/45; 528/368; 524/839; 524/840
(58) Field of Classification Search ..................... None
See application file for complete search history.

(56) References Cited

U.S. PATENT DOCUMENTS

| | | | |
|---|---|---|---|
| 3,635,870 A | 1/1972 | Thoma et al. | 260/30.8 |
| 3,640,937 A | 2/1972 | Thoma et al. | 260/30.8 |
| 3,658,746 A | 4/1972 | Rosendahl et al. | 260/30.8 |
| 4,108,814 A | 8/1978 | Reiff et al. | 260/29.2 TN |
| 5,738,912 A | 4/1998 | König et al. | 427/389 |

FOREIGN PATENT DOCUMENTS

| | | |
|---|---|---|
| CA | 2 408 723 | 11/2002 |
| EP | 0 916 647 | 5/1999 |

OTHER PUBLICATIONS

DIN.53 211, Jun. 1987, pp. 1-5, "Bestimmung der Auslaufzeit mit dem BIN-Becher".
DIN ISO 13320-1, pp. 1-34, "Particle size analysis—Laser diffraction methods", 1999.
J. Prakt. Chem., 336, (month unavailable) 1994, pp. 185-200, Hans Josef Laas et al, "Zur Synthese aliphatischer Polyisocyanate—Lackpolyisocyanate mit Biuret-, Isocyanurat- oder Uretdionstruktur".
Progress in Organic Coatings 36, (month unavailable) 1999, pp. 148-172, Douglas A Wicks t al, "Blocked isocyanates III: Part A. Mechanisms and chemistry".
Progress in Organic Coatings 9, (month unavailable) 1981, pp. 3-28, Zeno W. Wicks, Jr., "New Developments in the Field of Blocked Isocyanates".
Progress in Organic Coatings 3, (month unavailable) 1975, pp. 73-99, Zeno W. Wicks, Jr., "Blocked Isocyanates".

*Primary Examiner*—Rachel Gorr
(74) *Attorney, Agent, or Firm*—Joseph C. Gil

(57) ABSTRACT

The present invention relates to new hydrophilic polyurethane prepolymers and to their aqueous polyurethane-polyurea (PU) dispersions.

11 Claims, No Drawings

HYDROPHILIC POLYURETHANE-POLYUREA DISPERSIONS

CROSS REFERENCE TO RELATED PATENT APPLICATION

The present patent application claims the right of priority under 35 U.S.C. §119(a)–(d) of German Patent Application No. 102 602 70.0, filed Dec. 20, 2002.

FIELD OF THE INVENTION

The present invention relates to new hydrophilic polyurethane prepolymers and to their aqueous polyurethane-polyurea (PU) dispersions.

BACKGROUND OF THE INVENTION

In the coating of substrates, solventborne binders are increasingly being replaced by aqueous, environment-friendly systems. Binders based on polyurethane-polyurea dispersions are playing an increasing role, in particular, on the basis of their excellent properties.

In many sectors so-called post-crosslinkable PU dispersions are being used: The crosslinking mechanism of these systems is based on blocked isocyanate groups in combination with isocyanate-reactive groups.

The blocking of polyisocyanates for the temporary protection of the isocyanate groups is a long-known working method and is described for example in Houben Weyl, Methoden der organischen Chemie XIV/2, pp. 61–70. Curable compositions comprising blocked polyisocyanates find use, for example, in polyurethane coating materials.

An overview of blocking agents suitable in principle is found, for example, in Wicks et al. in Progress in Organic Coatings 1975, 3, pp. 73–79, 1981, 9, pp. 3–28 and 1999, 36, pp. 148–172.

The preparation of polyurethane dispersions containing blocked isocyanate groups is described in the literature for example in DE-A 195 48 030.

A disadvantage when using post-crosslinkable polyurethane dispersions of the prior art is that after deblocking and crosslinking a certain fraction of the blocking agent remains as a monomer in the resultant coating film and adversely effects its quality. Qualities such as scratch resistance and acid stability of one-component coating films are incomparable with those of two-component (2K) polyurethane coatings, owing to the residual blocking agent (e.g. T. Engbert, E. König, E. Jürgens, Farbe&Lack, Curt R. Vincentz Verlag, Hannover 10/1995).

Systems of this kind are prepared, with chain extension, in the range from 90 to 120° C., so that such crosslinking in aqueous systems can take place only with destabilization of the dispersion particles. The prior art methods of extending and crosslinking NCO prepolymers takes place by reaction of isocyanate-functional prepolymers with isocyanate-reactive components. Within the aqueous medium there is an uncontrolled and poorly reproducible reaction of water with the isocyanate groups, this reaction being all the more pronounced the more reactive the isocyanate used. Chain extension with amines, accordingly, is difficult to reproduce and, even where the reaction mixture has the same composition, can lead to dispersions having different pH values.

In the preparation of dispersions by the acetone method it is also possible to use reactive aromatic diisocyanates, but with that method it is necessary to use relatively large amounts of acetone, which must later on be removed by distillation in a laborious second reaction step.

The object of the present invention was to provide new hydrophilic polyurethane prepolymers which can be processed readily to aqueous polyurethane dispersions and which do not have the disadvantages known from the prior art.

SUMMARY OF THE INVENTION

The present invention is directed to a hydrophilic polyurethane (PU) prepolymer comprising a polymer backbone with structural units of formula (I),

in which
$R^1$ and $R^2$ independently of one another represent the radicals H, $C_1$–$C_{20}$-(cyclo)alkyl, $C_6$–$C_{24}$-aryl, $C_1$–$C_{20}$-(cyclo)alkyl ester or amide, $C_6$–$C_{24}$-aryl ester or amide, mixed aliphatic/aromatic radicals having 1 to 24 carbon atoms, which may also be part of a 4- to 8-membered ring, and
X is an electron-withdrawing group,
n is an integer from 0 to 5,
and also having structural units of polymeric polyols with a number average molecular weight range from 400 to 6000, the polymer backbone possessing ionic or potentially ionic and/or nonionically hydrophilizing groups.

The present invention is also directed to aqueous polyurethane-polyurea dispersions comprising the general structural unit (II),

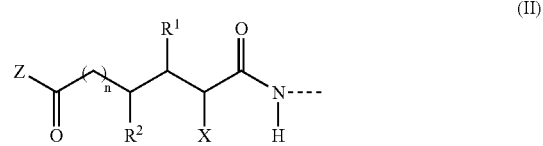

in which
$R^1$ and $R^2$ independently of one another represent the radicals H, $C_1$–$C_{20}$-(cyclo)alkyl, $C_6$–$C_{24}$-aryl, $C_1$–$C_{20}$-(cyclo)alkyl ester or amide, $C_6$–$C_{24}$-aryl ester or amide, mixed aphatic/aromatic radicals having 1 to 24 carbon atoms, which may also be part of a 4- to 8-membered ring,
X is an electron-withdrawing group,
Z represents OH, $OR^3$ or $NR^4R^5$, with
$R^3$ is selected from a $C_1$–$C_{20}$-(cyclo)alkyl radical, $C_2$–$C_{18}$-alkenyl radical, $C_5$–$C_8$-cycloalkenyl radical, $C_2$–$C_{18}$-alkynyl radical, $C_6$–$C_{24}$-aryl radical, $C_1$–$C_{20}$-(cyclo)alkyl ester and amide radical, $C_6$–$C_{24}$-aryl ester and amide radical, and $C_3$–$C_{12}$-heterocycloalkyl radicals, all of which can be unsubstituted or substituted by a group selected from $NO_2$, amino, cyano, carboxyl, ester, keto and aldehyde groups, $R^4$ and $R^5$ are independently of one another radicals selected from the group consisting of H, $C_1$–$C_{20}$-(cyclo)alkyl, $C_2$–$C_{18}$-alkenyl, $C_5$–$C_8$-cycloalkenyl, $C_2$–$C_{18}$-alkynyl, $C_6$–$C_{24}$-aryl, $C_1$–$C_{20}$-(cyclo)alkyl ester and amide, $C_6$–$C_{24}$-aryl ester and amide, $C_3$–$C_{12}$-heterocycloalkyl radicals, all of which may be unsubstituted or substituted by a group selected from $NO_2$, amino, cyano, carboxyl, ester, keto and aldehyde groups, and $R^4$ and $R^5$ together with the nitrogen atom may form a $C_3$–$C_{12}$-cycloalkyl or a $C_3$–$C_{13}$-heterocycloalkyl radical containing O, S or N atoms, and/or the general structural unit (III),

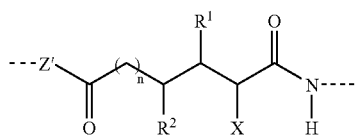

(III)

in which $R^1$, $R^2$ and X have the aforementioned meaning and

Z' represents a bridging oxygen atom or bridging secondary or tertiary nitrogen atom and n is an integer from 0 to 5.

The present invention is further directed to a process for preparing the water-dispersible or water-soluble polyurethane prepolymers described above. The process includes the step of reacting A1) at least one polyisocyanate having aliphatically, cycloaliphatically, araliphatically and/or aromatically attached isocyanate groups with A2) polymeric polyols of the average molar weight range from 400 to 6000, A3) optionally one or more polyhydric alcohols having 1 to 4 hydroxyl groups of the molecular weight range up to 400, A4) at least one ionic and/or potentially ionic and/or nonionic hydrophilic compound having NCO reactive groups, A5) at least one CH-acidic cyclic ketone of the general formula (IV),

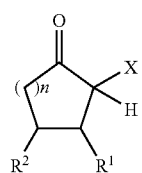

(IV)

in which

X is an electron-withdrawing group, $R^1$ and $R^2$ independently of one another are selected from the group of radicals consisting of H, $C_1$–$C_{20}$-(cyclo)alkyl, $C_6$–$C_{24}$-aryl, $C_1$–$C_{20}$-(cyclo)alkyl ester and amide, $C_6$–$C_{24}$-aryl ester and amide, mixed aliphatic/aromatic radicals having 1 to 24 carbon atoms, which can also be part of a 4 to 8-membered ring, n is an integer from 0 to 5, and with A6) optionally one or more (cyclo)aliphatic monoamines or polyamines or amino alcohols having 1 to 4 amino groups of the molecular weight range up to 400, in the presence of a catalyst and optionally in the presence of isocyanate-inert organic solvents, the molar ratio of isocyanate groups to isocyanate-reactive groups being from 0.5 to 3.

The present invention is additionally directed to a process for preparing an aqueous polyurethane-polyurea dispersion including the steps of:

(a) providing an aqueous phase, (b) providing a polyurethane prepolymer according to the invention having a backbone possessing ionic, potentially ionic and/or nonionically hydrophilizing groups, (c) partly or fully neutralizing potentially ionic groups, and (d) conducting a dispersion operation by transferring the polyurethane prepolymer to the aqueous phase, or vice versa (e) before, simultaneously or after step (d), chain extending with aminic components (A4) and/or (A6).

The polyurethane prepolymer includes a polymer backbone with structural units of the formula (I)

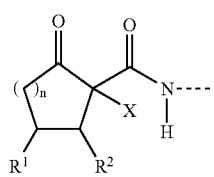

(I)

in which $R^1$ and $R^2$ independently of one another represent a radical selected from the group consisting of H, $C_1$–$C_{20}$-(cyclo)alkyl, $C_6$–$C_{24}$-aryl, $C_1$–$C_{20}$-(cyclo)alkyl ester and amide, $C_6$–$C_{24}$-aryl ester and amide, mixed aliphatic/aromatic radicals having 1 to 24 carbon atoms, which may also be part of a 4 to 8-membered ring, and X is an electron-withdrawing group, n is an integer from 0 to 5, and also with structural units of polymeric polyols having a number average molar weight range of from 400 to 6000.

The present invention is also directed to coating compositions including the above-described polyurethane-polyurea dispersions as well as substrates coated with the coating compositions. Additionally, the present invention is directed to a method of preparing coating materials, sizes or adhesives that includes adding the polyurethane prepolymers described above a composition selected from coating compositions, sizing compositions and adhesive compositions as well as a method of preparing such compositions.

DETAILED DESCRIPTION OF THE INVENTION

Other than in the operating examples, or where otherwise indicated, all numbers or expressions referring to quantities of ingredients, reaction conditions, etc. used in the specification and claims are to be understood as modified in all instances by the term "about".

It has now been found that using CH-acidic compounds with the parent structure of an activated cyclic ketone, particularly that of cyclopentanone-2-carboxyethyl ester, it is possible to prepare hydrophilic polyurethane prepolymers which are free of elimination products and which allow controlled aminic chain extension to be carried out in the aqueous phase.

The present invention provides hydrophilic polyurethane (PU) prepolymers comprising a polymer backbone with structural units of formula (I),

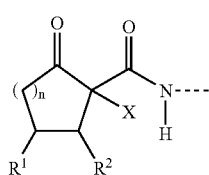

in which
R¹ and R² independently of one another the radicals H, $C_1$–$C_{20}$-(cyclo)alkyl, $C_6$–$C_{24}$-aryl, $C_{-C20}$-(cyclo)alkyl ester or amide, $C_6$–$C_{24}$-aryl ester or amide, mixed aliphatic/aromatic radicals having 1 to 24 carbon atoms, which may also be part of a 4- to 8-membered ring, and
X is an electron-withdrawing group,
n is an integer from 0 to 5, and also having structural units of polymeric polyols from the average molar weight range from 400 to 6000, the polymer backbone possessing ionic or potentially ionic and/or nonionically hydrophilizing groups.

A potentially ionic group for the purposes of the invention is a group capable of forming an ionic group.

A nonionically hydrophilizing group for the purposes of the invention is a group that does not include an ionic group, the inclusion of which in a molecule renders the molecule more water dispersible, more water soluble and/or more easily wetted by water.

Likewise provided by the present invention are aqueous polyurethane-polyurea dispersions comprising the general structural unit (II),

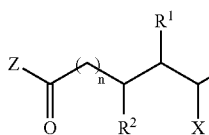

in which
R¹ and R² independently of one another the radicals H, $C_1$–$C_{20}$-(cyclo)alkyl, $C_6$–$C_{24}$-aryl, $C_1$–$C_{20}$-(cyclo)alkyl ester or amide, $C_6$–$C_{24}$-aryl ester or amide, mixed aliphatic/aromatic radicals having 1 to 24 carbon atoms, which may also be part of a 4 to 8-membered ring,
X is an electron-withdrawing group,
Z represents OH, OR³ or NR⁴R⁵, with
R³ a $C_1$–$C_{20}$-(cyclo)alkyl radical, $C_2$–$C_{18}$-alkenyl radical, $C_5$–$C_8$-cycloalkenyl radical, $C_2$–$C_{18}$-alkynyl radical, $C_6$–$C_{24}$-aryl radical, $C_1$–$C_{20}$-(cyclo)alkyl ester or amide radical, $C_6$–$C_{24}$-aryl ester or amide radical, $C_3$–$C_{12}$-heterocycloalkyl radicals, which can be unsubstituted or substituted by $NO_2$, amino, cyano, carboxyl, ester, keto or aldehyde groups,
R⁴/R⁵ independently of one another the radicals H, $C_1$–$C_{20}$-(cyclo)alkyl, $C_2$–$C_{18}$-alkenyl, $C_5$–$C_8$-cycloalkenyl, $C_2$–$C_{18}$-alkynyl, $C_6$–$C_{24}$-aryl, $C_1$–$C_{20}$-(cy-clo)alkyl ester or amide, $C_6$–$C_{24}$-aryl ester or amide, $C_3$–$C_{12}$-heterocycloalkyl radicals, which may be unsubstituted or substituted by $NO_2$, amino, cyano, carboxyl, ester, keto or aldehyde groups, and R⁴ and R⁵ together with the nitrogen atom may form a $C_3$–$C_{12}$-cycloalkyl or a $C_3$–$C_{13}$-heterocycloalkyl radical containing O, S or N atoms, and/or the general structural unit (III),

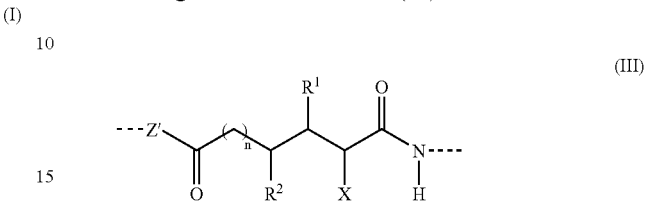

in which
R¹, R² and X have the aforementioned meaning and
Z' represents a bridging oxygen atom or bridging secondary or tertiary nitrogen atom and
n is an integer from 0 to 5.

The invention further provides a process for preparing the hydrophilic polyurethane prepolymers of the invention, characterized in that
A1) at least one polyisocyanate having aliphatically, cycloaliphatically, araliphatically and/or aromatically attached isocyanate groups are reacted with
A2) polymeric polyols of the average molar weight range from 400 to 6000,
A3) optionally one or more polyhydric alcohols having 1 to 4 hydroxyl groups of the molecular weight range up to 400,
A4) at least one ionic and/or potentially ionic and/or nonionic hydrophilic compound having NCO reactive groups,
A5) at least one CH-acidic cyclic ketone of the general formula (IV),

in which
X is an electron-withdrawing group,
R¹ and R² independently of one another are the radicals H, $C_1$–$C_{20}$-(cyclo)alkyl, $C_6$–$C_{24}$-aryl, $C_1$–$C_{20}$-(cyclo)alkyl ester or amide, $C_6$–$C_{24}$-aryl ester or amide, mixed aliphatic/aromatic radicals having 1 to 24 carbon atoms, which may also be part of a 4- to 8-membered ring,
n is an integer from 0 to 5, and with
A6) optionally one or more (cyclo)aliphatic monoamines or polyamines or amino alcohols having 1 to 4 amino groups of the molecular weight range up to 400, in the presence of a catalyst and optionally in the presence of isocyanate-inert organic solvents, the molar ratio of isocyanate groups to isocyanate-reactive groups being from 0.5 to 3, preferably from 0.95 to 2, more preferably from 1.00 to 1.8.

The polyurethane prepolymers of the invention contain preferably from 10 to 40% by weight of A1), from 30 to 85% by weight of A2), from 0 to 15% by weight of A3), from 1 to 40% by weight of A4), from 0.1 to 40% by weight of A5), and from 0.1 to 15% by weight of A6), the sum of the components adding to 100% by weight.

The polyurethane prepolymers of the invention more preferably contain from 10 to 30% by weight of A1), from 30 to 80% by weight of A2), from 0 to 12.5% by weight of A3), from 1 to 35% weight of A4), from 1 to 30% by weight of A5), and from 0.5 to 15% by weight of A6), the sum of the components adding to 100% by weight.

The polyurethane prepolymer of the invention very preferably contains from 15 to 30% by weight of A1), from 30 to 70% by weight of A2), from 0 to 10% by weight of A3), from 1 to 30% by weight of A4), from 5 to 25% by weight of A5), and from 0.5 to 10% by weight of A6), the sum of the components adding to 100% by weight.

Likewise provided by the present invention is a process for preparing aqueous polyurethane-polyurea dispersions, characterized in that the PU prepolymer comprising a polymer backbone with structural units of the formula (I)

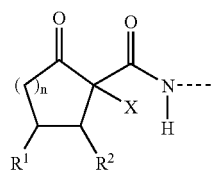

in which $R^1$ and $R^2$ independently of one another the radicals H, $C_1$–$C_{20}$-(cyclo)alkyl, $C_6$–$C_{24}$-aryl, $C_1$–$C_{20}$-(cyclo)alkyl ester or amide, $C_6$–$C_{24}$-aryl ester or amide, mixed aliphatic/aromatic radicals having 1 to 24 carbon atoms, which may also be part of a 4- to 8-membered ring, and X is an electron-withdrawing group, n is an integer from 0 to 5, and also with structural units of polymeric polyols of the average molar weight range from 400 to 6000, the polymer backbone possessing ionic or potentially ionic and/or nonionically hydrophilizing groups, is transferred to the aqueous phase and, in the case of the ionic or potentially ionic groups, these are partly or fully neutralized beforehand or simultaneously, a chain extension with aminic components (A4) and/or (A6) taking place before or after the dispersing operation.

The solids content of the PU dispersions of the invention can be varied in limits from 10 to 70% by weight. The PU dispersions of the invention preferably contain a solids content of from 20 to 60% by weight and more preferably from 25 to 50% by weight. The fraction of organic solvents in the overall composition is preferably less than 15% by weight, more preferably less than 10% by weight and very preferably less than 5% by weight.

The composition of the dispersions corresponds to the composition defined for the PU prepolymers of the invention, irrespective of whether the chain extension with aminic components (A4) and/or (A6) takes place at the stage of the preparation of the PU prepolymer or at the stage of the preparation of the dispersion in aqueous phase.

Suitable diisocyanates (A1) are in principle those of the molecular weight range 140 to 400 having aliphatically, cycloaliphatically, araliphatically and/or aromatically attached isocyanate groups, such as, for example, 1,4-diisocyanatobutane, 1,6-diisocyanatohexane (HDI), 2-methyl-1,5-diisocyanatopentane, 1,5-diisocyanato-2,2-dimethylpentane, 2,2,4- and 2,4,4-trimethyl-1,6-diisocyanatohexane, 1,10-diisocyanatodecane, 1,3- and 1,4-diisocyanato-cyclohexane, 1,3- and 1,4-bis-(isocyanatomethyl)cyclohexane, 1-isocyanato-3,3,5-trimethyl-5-isocyanatomethylcyclohexane (isophorone diisocyanate, IPDI), 4,4'-diisocyanatodicyclohexylmethane, 1-isocyanato-1-methyl-4(3)isocyanato-methylcyclohexane, bis(isocyanatomethyl)norbornane, 1,3- and 1,4-bis(2-isocyanatoprop-2-yl)benzene (TMXDI), 2,4-and 2,6-diisocyanatotoluene (TDI), 2,4'- and 4,4'-diisocyanatodiphenylmethane, 1,5-diisocyanatonaphthalene or any desired mixtures of such diisocyanates. Preference is given to 1,6-diisocyanato-hexane (HDI), 1-isocyanato-3,3,5-trimethyl-5-isocyanatomethylcyclohexane (isophorone diisocyanate, IPDI), 1,4-bis-(isocyanatomethyl)cyclohexane, 2,4- and 2,6-diisocyanatotoluene (TDI), 2,4'- and 4,4'-diisocyanatodiphenylmethane.

Particular preference is given to 1,6-diisocyanatohexane (HDI), 1-isocyanato-3,3,5-trimethyl-5-isocyanatomethylcyclohexane (isophorone diisocyanate, IPDI) and 2,4- and 2,6-diisocyanatotoluene (TDI).

Proportionally it is also possible to use polyisocyanates A1) preparable by modifying simple aliphatic, cycloaliphatic, araliphatic and/or aromatic diisocyanates, such as polyisocyanates constructed for example from at least two diisocyanates and having a uretdione, isocyanurate, urethane, allophanate, biuret, iminooxadiazine dione and/or oxadiazine trione structure, such as are described, for example, in J. Prakt. Chem. 336 (1994) pp. 185–200.

The polymeric polyols A2) in the molar weight range from 400 to 6000 are the customary ones such as have already long been used for polyurethanes, having an OH functionality of at least 1.6 to 4, such as, for example, polyacrylates, polyesters, polylactones, polyethers, polycarbonates, polyestercarbonates, polyacetals, polyolefins and polysiloxanes. Preference is given to polyols in a molar weight range from 600 to 2500 having an OH functionality of from 1.8 to 3 and more preferably from 1.9 to 2.1. Particularly preferred polyols are polyester-, polyether- and polycarbonate-polyols.

The hydroxyl-containing polycarbonates that are suitable are obtainable by reacting carbonic acid derivatives, e.g. diphenyl carbonate, dimethyl carbonate or phosgene, with diols. Examples of suitable such diols include ethylene glycol, 1,2- and 1,3-propanediol, 1,3- and 1,4-butanediol, 1,6-hexanediol, 1,8-octanediol, neopentyl glycol, 1,4-bishydroxymethylcyclohexane, 2-methyl-1,3-propanediol, 2,2,4-trimethylpentane-1,3-diol, dipropylene glycol, polypropylene glycols, dibutylene glycol, polybutylene glycols, bisphenol A, tetrabromobisphenol A but also lactone-modified diols. The diol component contains preferably from 40 to 100% by weight of hexane diol, preferably 1,6-hexanediol and/or hexanediol derivatives, preferably those which in addition to terminal OH groups have ether groups or ester groups.

The hydroxyl polycarbonates ought to be linear. They may, however, easily be branched where appropriate by the incorporation of polyfunctional components, especially low molecular mass polyols. Suitable for this purpose are, for example, glycerol, trimethylolpropane, hexane-1,2,6-triol, butane-1,2,4-triol, trimethylolpropane, pentaerythritol, quinitol, mannitol, and sorbitol, methylglycoside, 1,3,4,6-dianhydrohexitols.

Suitable polyether polyols are the polytetramethylene glycol polyethers known per se in polyurethane chemistry, which can be prepared, for example, by way of polymerization of tetrahydrofuran by cationic ring opening.

Additionally suitable polyetherpolyols are polyethers, such as, for example, the polyols prepared using starter molecules from styrene oxide, propylene oxide, butylene oxide, ethylene oxide or epichlorohydrin, especially propylene oxide. The polyalkylene oxide polyethers suitable as A2) are composed of less than 30 mol % of ethylene oxide units.

Examples of suitable polyester polyols include reaction products of polyhydric, preferably dihydric and optionally additionally trihydric alcohols with polybasic preferably dibasic carboxylic acids. Instead of the free polycarboxylic acids it is also possible to use the corresponding polycarboxylic anhydrides or corresponding polycarboxylic esters of lower alcohols or mixtures thereof to prepare the polyesters. The polycarboxylic acids can be aliphatic, cycloaliphatic, aromatic and/or heterocyclic in nature and may where appropriate be substituted, by halogen atoms for example, and/or unsaturated.

Component A3) comprises mono-, di-, tri- and/or tetra-hydroxy-functional substances of molecular weight up to 400, such as ethylene glycol, propylene glycol, 1,4-butanediol, 1,6-hexanediol, glycerol, trimethylolethane, trimethylolpropane, the isomeric hexanetriols, or pentaerythritol, for example, or mixtures of these compounds.

Examples of preferred components A3) are
i) alkanediols, such as ethanediol, 1,2- and 1,3-propanediol, 1,4- and 2,3-butanediol, 1,5-pentanediol, 1,3 dimethyl-propanediol, 1,6-hexanediol, neopentylglycol, cyclohexanedimethanol, 2-methyl-1,3-propanediol,
ii) etherdiols, such as diethylene diglycol, triethylene glycol or hydroquinone dihydroxyethyl ether,
iii) esterdiols of the general formulae (V) and (VI),

   (V)

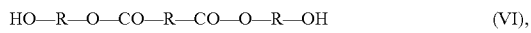   (VI), in which
R independently of one another linear or branched (cyclo-) alkylene or arylene radicals having 1 to 10 carbon atoms, preferably 2 to 6 carbon atoms,
such as δ-hydroxybutyl-ε-hydroxycaproic esters, ω-hydroxyhexyl-γ-hydroxybutyric esters, adipic acid (β-hydroxyethyl) ester or terephthalic acid bis(β-hydroxyethyl) ester.

Suitable components A4) are ionic or potentially ionic and/or nonionic hydrophilic compounds having isocyanate-reactive groups.

Nonionic hydrophilic compounds A4) are, for example, monohydric polyalkylene oxide polyether alcohols containing on average from 5 to 70, preferably from 7 to 55, ethylene oxide units per molecule, such as are obtainable conventionally by alkoxylating suitable starter molecules (e.g. in Ullmanns Encyclopädie der technischen Chemie, 4$^{th}$ edition, Volume 19, Verlag Chemie, Weinheim pp. 31–38). Examples of suitable starter molecules include saturated monoalcohols such as methanol, ethanol, n-propanol, isopropanol, n-butanol, isobutanol, sec-butanol, the isomers pentanols, hexanols, octanols and nonanols, n-decanol, n-dodecanol, n-tetradecanol, n-hexadecanol, n-octadecanol, cyclohexanol, the isomeric methylcyclohexanols or hydroxymethylcyclohexane, 3-ethyl-3-hydroxymethyloxetane or tetrahydrofurfuryl alcohol. Diethylene glycol monoalkyl ethers such as, for example, diethylene glycol monobutyl ether; unsaturated alcohols such as allyl alcohol, 1,1-dimethylallyl alcohol or oleyl alcohol, aromatic alcohols such as phenol, the isomeric cresols or methoxyphenols, araliphatic alcohols such as benzyl alcohol, anisyl alcohol or cinammyl alcohol; secondary monoamines such as dimethylamine, diethylamine, dipropylamine, diisopropylamine, dibutylamine, bis(2-ethylhexyl)amine, N-methyl- and N-ethylcyclohexylamine or dicyclohexylamine and also heterocyclic secondary amines such as morpholine, pyrrolidine, piperidine or 1H-pyrazole are likewise suitable.

Preferred starter molecules are saturated monoalcohols and also diethylene glycol monoalkyl ethers. Particular preference is given to using diethylene glycol monobutyl ether as starter molecule.

Alkylene oxides suitable for the alkoxylation reaction are, in particular, ethylene oxide and propylene oxide, which can be used in either order or else in a mixture in the alkoxylation reaction.

The polyalkylene oxide polyether alcohols are either straight polyethylene oxide polyethers or mixed polyalkylene oxide polyethers at least 30 mol %, preferably at least 40 mol %, of whose alkylene oxide units are composed of ethylene oxide units. Preferred nonionic hydrophilic compounds A4) are monofunctional mixed polyalkylene oxide polyethers containing at least 40 mol % ethylene oxide units and not more than 60 mol % propylene oxide units.

Suitable ionic or potentially ionic components A4) which can be used in addition to or instead of the nonionic compounds are, for example, mono- and dihydroxycarboxylic acids, mono- and diaminocarboxylic acids, mono- and dihydroxysulphonic acids, mono- and diaminosulphonic acids, and mono- and dihydroxyphosphonic acids or mono- and diaminophosphonic acids and their salts, such as dimethylolpropionic acid, hydroxypivalic acid, N-(2-aminoethyl)-β-alanine, 2-(2-aminoethylamino)ethanesulphonic acid, ethylenediamine-propyl- or -butyl-sulphonic acid, 1,2- or 1,3-propylenediamine-β-ethylsulphonic acid, lysine, 3,5-diaminobenzoic acid, the hydrophilizing agent of Example 1 from EP-A 0 916 647 and the alkali metal salts and/or ammonium salts thereof; the adduct of sodium bisulphite with but-2-ene-1,4-diol, polyethersulphonate, the propoxylated adduct of 2-butenediol and NaHSO$_3$ (e.g. in DE-A 2 446 440, page 5–9, Formula I–III), and also structural units which can be converted into cationic groups, such as N-methyldiethanolamine, are used as hydrophilic synthesis components. Additionally it is also possible to make use as component A4) of CAPS (cyclohexylaminopropanesulphonic acid) as described for example in WO 01/88006.

Preferred ionic or potential ionic compounds A4) are those which possess carboxyl or carboxylate and/or sulphonate groups and/or ammonium groups. Particularly preferred ionic compounds A4) are those containing sulphonate groups and/or carboxylate groups as ionic or potentially ionic groups, such as the salts of 2-(2-aminoethylamino) ethanesulphonic acid, dimethylolpropionic acid, and of the hydrophilizing agent of Example 1 from EP-A 0 916 647.

Suitable as component A5) are CH-acidic cyclic ketones of the general formula (IV),

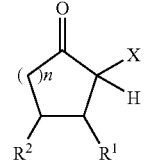   (IV)

in which
X an electron-withdrawing group, $R^1$ and $R^2$ independently of one another are the radicals H, $C_1$–$C_{20}$-(cyclo)alkyl, $C_6$–$C_{24}$-aryl, $C_1$–$C_{20}$-(cyclo)alkyl ester or amide, $C_6$–$C_{24}$-aryl ester or amide, mixed aliphatic/aromatic radicals having 1 to 24 carbon atoms, which may also be part of a 4- to 8-membered ring, n is an integer from 0 to 5.

The electron-withdrawing group X can be any substituent which leads to CH acidity of the α-hydrogen. Possible examples of such groups include ester groups, sulphoxide groups, sulphone groups, nitro groups, phosphonate groups, nitrile groups, isonitrile groups or carbonyl groups. Preference is given to nitrile and ester groups, particular preference to methyl carboxylate and ethyl carboxylate groups.

Also suitable are compounds of the general formula (IV) whose ring optionally contain heteroatoms, such as oxygen, sulphur, or nitrogen atoms. Preference is given in this context to the structural pattern of a lactone.

The activated cyclic system of the formula (IV) preferably has a ring size of 5 (n=1) and 6 (n=2).

Preferred compounds of the general formula (IV) are cyclopentanone-2-carboxy-methyl ester and -carboxyethyl ester, cyclopentanone-2-carbonitrile, cyclohexanone-2-carboxymethyl ester and -carboxyethyl ester or cyclopentanone-2-carbonylmethane. Particular preference is given to cyclopentanone-2-carboxy-methyl ester and -carboxyethyl ester and to cyclohexanone-2-carboxymethyl ester and -carboxyethyl ester. The cyclopentanone systems are readily obtainable technically by Dieckmann condensation of dimethyl adipate or diethyl adipate. Cyclohexanone-2-carboxymethyl ester can be prepared by hydrogenating methyl salicylate.

It is of course also possible to use mixtures of these CH-acidic ketones with one another and/or with other blocking agents. Examples of suitable further blocking agents are alcohols, lactams, oximes, malonates, alkyl acetoacetates, triazoles, phenols, imidazoles, pyrazoles, and amines, such as butanone oxime, diisopropyl amine, 1,2,4-triazole, dimethyl-1,2,4-triazole, imidazole, diethyl malonate, ethyl acetoacetate, acetone oxime, 3,5-dimethylpyrazole, ε-caprolactam, N-methyl-, N-ethyl-, N-(iso)propyl-, N-n-butyl-, N-iso-butyl-, N-tert-butyl-benzylamine or 1,1-dimethylbenzylamine, N-alkyl-N-1,1-dimethylmethyl-phenylamine, adducts of benzylamine with compounds having activated double bonds such as malonates, N,N-dimethylamino-propylbenzylamine, and other substituted or unsubstituted benzylamines containing tertiary amino groups and/or dibenzylamine, or any desired mixtures of these blocking agents.

Preference is given to using cyclopentanone-2-carboxymethyl ester, cyclopentanone-2-carboxyethyl ester, and cyclohexanone-2-cyarboxymethyl ester as blocking agents A5). A particularly preferred blocking agent A5) is cyclopentanone-2-carboxyethyl ester.

Suitable components A6) include further isocyanate-reactive components such as mono-, di-, tri-, and/or tetra-amino-functional substances and also amino alcohols from the molecular weight range up to 400, such as ethylenediamine, 1,2- and 1,3-diaminopropane, 1,3-, 1,4- and 1,6-diaminohexane, 1,3-diamino-2,2-dimethyl-propane, 1-amino-3,3,5-trimethyl-5-aminoethylcyclohexane (IPDA), 4,4'-diaminodicyclohexylmethane, 2,4- and 2,6-diamino-1-methylcyclohexane, 4,4'-diamino-3,3'-dimethyldicyclohexylmethane, 1,4-bis-(2-aminoprop-2-yl)cyclohexane, polyamines such as ethylenediamine, 1,2- and 1,3-diaminopropane, 1,4-diaminobutane, 1,6-diaminohexane, iso-phoronediamine, the isomer mixture of 2,2,4- and 2,4,4-trimethylhexamethylenediamine, 2-methylpentamethylenediamine, diethylenetriamine, 1,3- and 1,4-xylylenediamine, α,α,α',α'-tetramethyl-1,3- and -1,4-xylylenediamine and 4,4-diaminodicyclohexyl-methane, aminoethanol, diethanolamine or mixtures of these compounds. Suitable diamines for the purposes of the invention also include hydrazine, hydrazine hydrate, and substituted hydrazines, such as N-methylhydrazine, N,N'-dimethyl-hydrazine and the homologues thereof and also acid dihydrazides of adipic acid, β-methyladipic acid, sebacic acid, hydracrylic acid and terephthalic acid, semicarbazido-alkylene hydrazides, such as β-semicarbazidopropionic hydrazide (e.g. DE-A 17 70 591), for example, semicarbazidoalkylene-carbazine esters, such as 2-semicarbazidoethyl-carbazine ester (e.g. DE-A 19 18 504) or else amino semicarbazide compounds, such as β-aminoethyl semicarbazidocarbonate (e.g. DE-A 19 02 931), for example.

To prepare the polyurethane prepolymers of the invention it is usual to charge some or all of the constituents A1) to A5) containing no primary or secondary amino groups to the reactor and to dilute this initial charge where appropriate with a water-miscible but isocyanate-inert solvent, but preferably without solvent, and to heat the mixture at relatively high temperatures, preferably in the range from 40 to 140° C., more preferably from 40 to 90° C.

Preferably, in the preparation of the polyurethane chains, component A5), to form an NCO prepolymer, is preferably added to the reaction mixture in the presence of a catalyst following complete reaction of A1) to A4).

Suitable catalysts for the reaction of component A5) with the isocyanate groups in the process of the invention are alkali metal and alkaline earth metal bases, such as powdered sodium carbonate (soda), for example. Depending on the cyclic ketone used, it is also possible to employ trisodium phosphate or DABCO (1,4-diazabicyclo[2.2.2]octane). Likewise suitable are the carbonates of the metals of the second transition group. Preference is given to using sodium carbonate or potassium carbonate. Alternatively the cyclic ketone can be reacted with the isocyanate in the presence of zinc salt catalysts. Particular preference is given to the reaction with zinc 2-ethylhexanoate or zinc acetylacetonate.

From 0.05 to 10% by weight, preferably from 0.1 to 3% by weight, of a catalyst is added to the process of the invention for preparing the PU prepolymer. With particular preference from 0.2 to 1% by weight of the catalyst is added.

It is possible to carry out the reaction under atmospheric pressure or increased pressure, e.g. above the atmospheric pressure boiling temperature of any solvent added, such as acetone, for example.

Examples of suitable solvents are acetone, butanone, tetrahydrofuran, dioxane, acetonitrile, dipropylene glycol dimethyl ether and 1-methyl-2-pyrrolidone, which can be added not only at the beginning of the preparation but also, where appropriate, in portions later on. Preference is given to acetone, butanone and 1-methyl-2-pyrrolidone.

In the preparation of the polyurethane-polyurea dispersions of the invention the catalysts known to accelerate the isocyanate addition reaction, such as triethylamine, 1,4-diazabicyclo[2.2.2]octane, tin dioctoate or dibutyltin dilaurate, can be included in the initial charge or metered in later on. Preference is given to dibutyltin dilaurate.

Subsequently, the constituents A1) to A5) containing no primary or secondary amino groups that were not added, where appropriate, at the beginning of the reaction are metered in. In the preparation of polyurethane prepolymers the molar ratio of isocyanate groups to isocyanate-reactive groups is from 0.90 to 3, preferably from 0.95 to 2, more preferably from 1.00 to 1.8. The reaction of components A1)

with A2) to A5) takes place partly or completely, but preferably completely, based on the total amount of isocyanate-reactive groups of the initial charge fraction of A2) to A5) containing no primary or secondary amino groups. The degree of reaction is normally monitored by following the NCO content of the reaction mixture. This can be done either by spectroscopic measurements, e.g. infrared or near-infrared spectra, determinations of the refractive index, or chemical analyses, such as titrations, on samples taken. Where appropriate, the isocyanate groups still present at that stage can be reacted in whole or in part by reaction with aminic components A4) and/or A6).

Converting the polyurethane prepolymers of the invention into PU dispersions of the invention can be prepared by all of the processes known from the prior art, such as emulsifier/shear force, acetone, prepolymer mixing, melt emulsification, ketimine, and solids spontaneous dispersing processes or derivatives thereof. A compilation of these methods is in Methoden der organischen Chemie (Houben-Weyl, Additional and Supplementary Volumes to the $4^{th}$ Edition, Volume E20, H. Bartl and J. Falbe, Stuttgart, N.Y., Thieme 1987, pp. 1671–1682). Preference is given to the melt emulsification, prepolymer mixing, and acetone processes.

The structural unit (I) in the polyurethane prepolymers of the invention allows chain extension to be carried out in the aqueous medium. Hence in preparing the PU prepolymers of the invention even very reactive polyisocyanates such as aromatic polyisocyanates and/or 1,6-hexamethylene diisocyanate can be used. In this case it is then possible to prepare the dispersions under the conditions of the melt emulsification or prepolymer mixing process.

For the preparation of the polyurethane-polyurea dispersion, if not carried out in the starting molecules, salts are formed from all or some of the anionically and/or cationically dispersing groups after or during the preparation of the PU prepolymers of the invention from A1) to A5). In the case of anionic groups this is done using bases such as ammonia, ammonium carbonate or ammonium hydrogencarbonate, trimethylamine, triethylamine, tributylamine, diisopropylethylamine, dimethylethanolamine, diethylethanolamine, triethanolamine, potassium hydroxide or sodium carbonate, preferably triethylamine, triethanolamine, dimethylethanolamine or diisopropylethylamine. The molar amount of the bases used is given by the degree of neutralization of the anionic groups. The degree of neutralization of the anionic groups is between 50 and 120%, preferably between 60 and 100%. In the case of cationic groups use is made of dimethyl sulphate; phosphoric acid or succinic acid. Where only nonionically hydrophilicized compounds A4) with ether groups are used the neutralization step is omitted. Neutralization may also take place simultaneously with dispersing, with the dispersing water already containing the neutralizing agent.

Any remaining isocyanate groups and also the groups of formula (I) are reacted in whole or in part by reaction with aminic components A4) and/or A6). This chain extension can be carried out either in solvent prior to dispersing or in water after dispersing. Where aminic components A4) are present, chain extension takes place preferably prior to dispersing.

The aminic component A4) and/or aminic component A6) can be added to the reaction mixture in dilution with organic solvents and/or with water. It is preferred to use from 70 to 95% by weight of solvent and/or water. Where two or more aminic components are present, the reaction may take place in succession in any order or simultaneously by addition of a mixture.

For the purpose of preparing the polyurethane-polyurea dispersion of the invention the polyurethane prepolymers of the invention either are introduced into the dispersing water, where appropriate with strong shearing, such as vigorous stiring, for example, or, conversely, the dispersing water is stirred into the prepolymers. Thereafter, if it has not already taken place in the homogeneous phase, the molar mass is increased by reaction of any isocyanate groups present, but also the group of the formula (I) present in the prepolymer, with chain extender A4) and/or A6). The amount of polyamine A6) used depends on the unreacted isocyanate groups still present and on the amount of the groups of the formula (I). Preferably from 50 to 100%, more preferably from 75 to 95%, of the molar amount of the isocynate groups and, where appropriate, from 10 to 100% of the groups corresponding to the formula (I) are reacted with polyamines A6).

If desired, the organic solvent can be removed by distillation. The dispersions have a solids content of from 20 to 70% by weight, more preferably from 30 to 65% by weight.

The invention finally also provides a process for producing coatings, characterized in that the polyurethane dispersions of the invention are used alone or in combination with curing agents and/or water dispersible, emulsifiable or soluble polymers present in dispersed form, as binders, sizes or coating compositions, for example.

Polymers in disperse form and soluble, emulsifiable or dispersible in water are, for example, polyester polymers with or without epoxide groups, polyurethanes, acrylic polymers, vinyl polymers such as polyvinyl acetate, polyurethane dispersions, polyacrylate dispersions, polyurethane-polyacrylate hybrid dispersions, polyvinyl ether and/or polyvinyl ester dispersions, polystyrene and/or polyacrylonitrile dispersions, which can be used both in mixtures and also in combination with further blocked polyisocyanates and amino crosslinker resins such as melamine resins, for example. The solids content of the resins is preferably from 10 to 100% by weight, more preferably from 30 to 100% by weight.

The polyurethane dispersions of the invention, alone or in combination with further aqueous binders, curing agents or adhesives, can be applied to a suitable substrate by any desired methods, with the aid for example of appropriate equipment, such as spray applicators or roller applicators, for example. Suitable substrates are selected for example from the group consisting of metal, wood, glass, glass fibres, carbon fibres, stone, ceramic minerals, concrete, hard and flexible plastics of any of a very wide variety of kinds, woven and non-woven textiles, leather, paper, hard fibres, straw, and bitumen, which may also have been conventionally primed prior to coating, where appropriate. Preferred substrates are plastics, glass fibres, carbon fibres, metals, textiles and leather.

Not only the PU prepolymers of the invention but also the polyurethane-polyurea dispersions preparable from them can be used for the preparation of coating materials, sizes or adhesives.

The present invention provides coating compositions comprising the polyurethane dispersions of the invention.

The present invention further provides substrates coated with coating compositions comprising the PU dispersions of the invention.

EXAMPLES

Products Used:

Polyol 1: difunctional polyether based on propylene oxide, having an OH number of 263 mg KOH/g and an average molecular weight of 426 (polyethersulphonate, Bayer Espania, S. A., Barcelona, ES)

Polyol 2: polyester formed from adipic acid, 1,6-hexanediol and neopentyl glycol, having a molecular weight of 1700 g/mol, an OH number of 66 and a weight ratio of hexanediol and neopentyl glycol of approximately 1.6 to 1

Polyol 3: polyester based on adipic acid and 1,6-hexanediol, OH number 47 mg KOH/g solids, molar weight 2387 g/mol Polyol 4: monofunctional polyether prepared starting from n-butanol and based on ethylene oxide/propylene oxide (approximately 85:15), having an average molar weight of 2250 and an OH number of 25

Polyol 5: hexanediol polycarbonatediol of OH—N=56 (Desmophen® 2020, Bayer AG, Leverkusen, DE)

Polyol 6: polypropylene oxide diol of OH—N=56 (Desmophen® 3600, Bayer AG, Leverkusen, DE)

Polyol 7: polypropylene oxide diol of OH—N=200 (Desmophen® L400, Bayer AG, Leverkusen, DE)

Polyol 8: polypropylene oxide triol of OH—N=56 (Baygal® 70RE30, Bayer AG, Leverkusen, DE)

Polyisocyanate 1: 1-isocyanato-3,3,5-trimethyl-5-isocyanatomethyl-cyclohexane (isophorone diisocyanate) (Desmodur® I, Bayer AG, Leverkusen, DE)

Polyisocyanate 2: 1,6-hexamethylene diisocyanate (Desmodur® H, Bayer AG, Leverkusen, DE)

Polyisocyanate 3: 4,4'-diisocyanatodicyclohexylmethane (Desmodur® W, Bayer AG, Leverkusen, DE)

Polyisocyanate 4: 4,4'-methylenediphenyl diisocyanate (Desmodur® 44M, Bayer AG, Leverkusen, DE)

Polyisocyanate 5: 2,4-tolylene diisocyanate (Desmodur T 100, Bayer AG, Leverkusen, DE)

Amine 1: alkylamine (Imprafix® VP LS 2330, Bayer AG, Leverkusen, DE)

Amine 2: 45% strength aqueous solution of the sodium salt of 2-(2-aminoethylamino)ethanesulphonic acid (AAS solution, Bayer AG, Leverkusen, DE)

The average particle size (APS) was determined in acordance with DIN ISO 13320-1 by laser correlation spectroscopy using a Malvern Zetamaster 1000.

Example 1

In a 500 ml three-necked flask with reflux condensor 29.84 g of polyol 3, 8.71 g of polyol 1 and 8.41 g of 1,6-hexanediol were melted and the melt was dewatered at 110° C. for one hour. Then at 80° C. 22.54 g of N-methylpyrrolidone (NMP) were added and 25.82 g of polyisocyanate 5 were added dropwise over the course of 30 minutes at a constant temperature (80° C.) with cooling. After a subsequent stirring time of approximately 10 minutes the NCO content fell by $\frac{1}{10}$ below the theoretical figure of 3.88%. The mixture was cooled to 50° C. Subsequently 0.073 g of zinc 2-ethylhexanoate were stirred in and 13.76 g of cyclopentanone-2-carboxyethyl ester (156.2 g/mol) were added. The mixture was left with stirring at 70° C. until NCO groups were no longer detectable by titration (approximately 3 hours). Thereafter 217.79 g of water warmed to 40° C. were added over the course of 10 minutes with vigorous stirring to the resin solution, which was at a temperature of 70° C. After 5 minutes a chain extension solution consisting of 10 g of water, 1.05 g of 1,5-diamino-2-methylpentane and 0.75 g of hydrazine hydrate (50 g/mol) was added to the dispersion over the course of 5 minutes. After cooling to 30° C. the dispersion was filtered through a Seitz T5500 filter.

APS (average particle size)=122 nm.

Example 2

In a 500 ml three-necked flask with reflux condensor 29.84 g of polyol 3, 8.71 g of polyol 1 and 8.41 g of 1,6-hexanediol were melted and the melt was dewatered at 110° C. for one hour. At 80° C. 22.54 g of NMP were added and 25.82 g of polyisocyanate 5 were added dropwise at constant temperature. An exothermic reaction ensued. After about 30 minutes the dropwise addition was at an end. After a subsequent stirring time of a further 10 minutes the NCO content fell by $\frac{1}{10}$ below the theoretical figure of 3.88%. The mixture was cooled to 50° C. Subsequently 0.073 g of zinc 2-ethylhexanoate were stirred in and 13.76 g of cyclopentanone-2-carboxyethyl ester (156.2 g/mol) were added. The mixture was left with stirring at 70° C. until NCO content was no longer detectable (approximately 3 hours). Thereafter 217.79 g of water warmed to 40° C. were added over the course of 10 minutes with vigorous stirring to the resin solution, which was at a temperature of 70° C. After 5 minutes a chain extension solution consisting of 10 ml of water, 0.63 g of 1,5-diamino-2-methylpentane and 0.50 g of hydrazine hydrate was added to the dispersion. After cooling to 30° C. the dispersion was filtered through a Seitz T5500 filter.

APS=146 nm.

Example 3

In a 500 ml three-necked flask with reflux condensor 34.61 g of polyol 3, 7.84 g of polyol 1 and 8.41 g of 1,6-hexanediol were melted and the melt was dewatered at 110° C. for one hour. At 80° C. 22.54 g of NMP were added and 24.27 g of polyisocyanate were added dropwise. An exothermic reaction ensued. After about 30 minutes the dropwise addition was at an end. After a subsequent stirring time of a further 10 minutes the NCO content fell by $\frac{1}{10}$ below the theoretical figure of 2.97%. The mixture was cooled to 50° C. Subsequently 0.075 g of zinc 2-ethylhexanoate were stirred in and 11.01 g of cyclopentanone-2-carboxyethyl ester (156.2 g/mol) were added. The mixture was left with stirring at 70° C. for about 3 hours until reaction of the NCO groups was complete. Dispersion was then carried out by addition of 217.79 g of water (about 40° C.) to the resin with vigorous stirring and after 5 minutes extension was carried out with a chain extension solution composed of 10 ml of water and 3.16 g of 1,5-diamino-2-methylpentane and 0.60 g of hydrazine hydrate (50 g/mol). After cooling to 30° C. the dispersion was filtered through a Seitz T5500 filter.

APS=103 nm.

Example 4

In a 500 ml three-necked flask with reflux condensor 34.61 g of polyol 3, 7.84 g of polyol 1 and 8.41 g of 1,6-hexanediol were melted and the melt was dewatered at 110° C. for one hour. At 80° C. 22.54 g of NMP were added and 24.27 g of polyisocyanate 5 were added dropwise. An exothermic reaction ensued. After about 30 minutes the dropwise addition was at an end. After a subsequent stirring time of a further 10 minutes the NCO content fell by ¹⁄₁₀ below the theoretical figure of 2.97%. The mixture was cooled to 50° C. Subsequently 0.075 g of zinc 2-ethylhexanoate were stirred in and 11.01 g of cyclopentanone-2-carboxyethyl ester (156.2 g/mol) were added. The mixture was left with stirring at 70° C. for about 3 hours until NCO groups were no longer detected.

Then dispersion was carried out with 217.79 g of warm water (about 40° C.). Subsequently extension was carried out with a chain extension solution composed of 10 ml of water, 2.38 g of 1,5-diamino-2-methylpentane and 0.50 g of hydrazine hydrate (50 g/mol). After cooling to 30° C. the dispersion was filtered through a Seitz T5500 filter.

APS=115 nm.

Examples 1–4 demonstrate the straightforward preparation of aromatic polyurethane dispersions by the prepolymer mixing process.

Example 5

In a 500 ml three-necked flask with reflux condensor 34.61 g of polyol 3, 7.84 g of polyol 1 and 8.41 g of 1,6-hexanediol were melted and the melt was dewatered at 110° C. for one hour. At 80° C. 24.43 g of NMP were added and 30.97 g of polyisocyanate 1 were added dropwise over the course of 30 minutes. The exothermic heat produced was dissipated by cooling. After a subsequent stirring time of approximately 14 hours the NCO content had fallen by ¹⁄₁₀ below the theoretical figure of 2.77%. The mixture was cooled to 50° C. and 0.082 g of zinc 2-ethylhexanoate were stirred in and then 10.93 g of cyclopentanone-2-carboxyethyl ester (156.2 g/mol) were added. The mixture was stirred at 70° C. for approximately 16 hours until NCO was no longer detectable. It was subsequently dispersed with 234.44 g of warm water (40° C.). After 5 minutes extension was carried out with a chain extension solution composed of 10 ml of water, 3.14 g of 1,5-diamino-2-methylpentane (116 g/mol) and 0.60 g (0.024 eq) of hydrazine hydrate (50 g/mol). After cooling to 30° C. the dispersion was filtered through a Seitz T5500 filter.

APS=104 nm.

Example 6

In a 500 ml three-necked flask with reflux condensor 34.61 g of polyol 3, 7.84 g of polyol 1 and 8.41 g of 1,6-hexanediol were melted and the melt was dewatered at 110° C. for one hour. At 80° C. 24.43 g of NMP were added and 30.97 g of polyisocyanate 1 were added dropwise over the course of 30 minutes. The exothermic heat produced was dissipated by cooling. After a subsequent stirring time of approximately 14 hours the NCO content had fallen by ¹⁄₁₀ below the theoretical figure of 2.77%. The mixture was cooled to 50° C. and 0.082 g of zinc 2-ethyl-hexanoate were stirred in and then 10.93 g of cyclopentanone-2-carboxyethyl ester (156.2 g/mol) were added. The mixture was stirred at 70° C. until NCO was no longer detectable (approximately 16 hours). Then 234.44 g of water warmed to 40° C. were added to the resin with vigorous stirring in 5 minutes. Thereafter extension was carried out with a chain extension solution composed of 10 ml of water, 2.40 g of 1,5-diamino-2-methylpentane and 0.50 g of hydrazine hydrate (50 g/mol). After cooling to 30° C. the dispersion was filtered through a Seitz T5500 filter.

APS=102 nm.

Example 7

In a 500 ml three-necked flask with reflux condensor 34.61 g of polyol 3, 7.84 g of polyol 1 (212 g/mol) and 8.41 g of 1,6-hexanediol were melted and the melt was dewatered at 110° C. for one hour. At 80° C. 24.43 g of NMP were added and 38.91 g of polyisocyanate 3 were added dropwise over the course of 30 minutes. After a subsequent stirring time of approximately 72 hours the NCO content had fallen below the theoretical figure of 3.24%. The mixture was cooled to 50° C. and 0.09 g of zinc 2-ethylhexanoate were stirred in and then 13.75 g of cyclopentanone-2-carboxyethyl ester were added. The mixture was stirred at 70° C. for about 30 hours until NCO was no longer detectable. Then 251.98 g of water warmed to 40° C. were added with vigorous stirring over the course of 5 minutes. Thereafter extension was carried out with a chain extension solution composed of 10 ml of water, 3.95 g of 1,5-diamino-2-methylpentane and 0.75 g of hydrazine hydrate (50 g/mol). After cooling to 30° C. the dispersion was filtered through a Seitz T5500 filter.

APS=120 nm.

Example 8

In a 500 ml three-necked flask with reflux condensor 34.61 g of polyol 3, 7.84 g of polyol 1 and 8.41 g of 1,6-hexanediol were melted and the melt was dewatered at 110° C. for one hour. At 80° C. 24.43 g of NMP were added and 38.91 g of polyisocyanate 3 were added dropwise over the course of 30 minutes. After a subsequent stirring time of approximately 72 hours the NCO content had fallen by ¹⁄₁₀ below the theoretical figure of 3.24%. The mixture was cooled to 50° C. and 0.09 g of zinc 2-ethylhexanoate were stirred in and then 13.75 g of cyclopentanone-2-carboxyethyl ester (156.2 g/mol) were added. The mixture was stirred at 70° C. for about 30 hours until NCO-freedom was reached. Then 251.98 g of water warmed to 40° C. were added with vigorous stirring. Thereafter extension was carried out with a chain extension solution composed of 10 ml of water, 2.41 g of 1,5-diamino-2-methylpentane and 0.51 g of hydrazine hydrate (50 g/mol), added over the course of 5 minutes. After cooling to 30° C. the dispersion was filtered through a Seitz T5500 filter.

APS=116 nm.

Example 9

A 1 l four-necked flask with internal thermometer and dropping funnel was charged with 50.1 g of polyol 3 together with 4.6 g of DMPA (dimethylolpropionic acid, Perstorp Chemicals GmbH, Arnsberg, Germany) and 14.1 g of 1,6-hexanediol at 100° C. and this initial charge was dewatered for 1 hour under a pressure of less than 5 mbar. The apparatus was subsequently blanketed with nitrogen and the nitrogen atmosphere was maintained throughout the reaction period. The reaction mixture was admixed with 33.0 g of NMP (N-methyl-pyrrolidone) and heated to 85° C. 55.4 g of polyisocyanate 1 were added to this mixture. Stirring was continued at 85° C. until the NCO value of the solution had fallen slightly below 3.90% (reaction time approximately 3 hours). The resulting prepolymer was cooled to 65° C., then 0.151 g of zinc 2-ethylhexanoate was added to it and 23.2 g of cyclopentanone-2-carboxyethyl ester (156.2 g/mol) were added cautiously dropwise so that the reaction temperature did not rise above 70° C. The mixture was stirred at 70° C. until the NCO value was zero, at which point 3.5 g of triethylamine were added. After 10 minutes of subsequent stirring the mixture was dispersed by adding 207.9 g of water warmed to 40° C. beforehand. The dispersion was stirred until homogeneous and then a 10% strength solution of 3.5 g of 1,5-diamino-2-methylpentane and 0.9 g of hydrazine hydrate (equivalent weight 50 g/mol) in water was added dropwise over the course of 30 minutes. After cooling to 30° C. the dispersion was filtered through a Seitz T5500 filter.

APS=211 nm

Example 10

263.5 g of polyol 2 and 65.7 g of polyol 1 were charged to a four-necked flask and this initial charge was dewatered at 100° C. under reduced pressure for 1 hour. 165.4 g of N-methylpyrrolidone and 62.9 g of neopentyl glycol were added to the dewatered mixture. The resulting mixture was homogenized at 70° C., cooled to 60° C. and quickly admixed with 206.4 g of polyisocyanate 2. Utilizing the heat of reaction the mixture was stirred at 80° C. until the theoretical NCO content of 3.6% was reached. It was then cooled to 50° C., 0.7 g of zinc acetylacetonate was added and the mixture was homogenized for 5 minutes. Thereafter at 50° C. 103.6 g of cyclopentanone-2-carboxyethyl ester were added and the mixture was stirred at 65° C. until NCO was no longer detectable. 750 g of the resin melt were added with vigorous stirring over the course of 5 minutes to 870 g of water warmed at 40° C. After the fine dispersion obtained had been stirred at mixing temperature for 5 minutes, chain extension was carried out by addition of an aqueous solution consisting of 2.2 g of ethylenediamine, 4.3 g of 1,5-diamino-2-methylpentane and 58.5 g of water. In the course of addition of the amine an increase in particle size was observed. After two hours the dispersion was cooled to room temperature and filtered.

APS: 280 nm
pH (10% strength aqueous solution): 6.6
Viscosity: 52 mPas

Example 10 demonstrates that stable polyurethane dispersions can be prepared straightforwardly from 1,6-diisocyanatohexane-based hydrophilicized prepolymers by the prepolymer mixing process or inverse prepolymer mixing process.

Example 11

2000.0 g of polyol 5, 1200.0 g of polyol 8 and 300.0 g of polyol 4 were dewatered at 120° C. and 15 mbar for 1 hour. At 90° C. 744.0 g of polyisocyanate 1 were added. The mixture was stirred at 90 to 100° C. until a constant isocyanate content of 3.3% was reached. The reaction mixture was cooled to 50° C. and 250.0 g of cyclopentanone-2-carboxyethyl ester and 5.0 g of Zn (2-ethyl-)hexanoate were added. After 6 h the reaction product was diluted with 4000.0 g of acetone and cooled to 40° C.

Over the course of 5 minutes 650.0 g of a 30% strength solution of an adduct of 1 mol of acrylic acid and 1 mol of 1-amino-3,3,5-trimethyl-5-aminomethyl-cyclohexane (isophoronediamine) and subsequently 71.0 g of triethylamine in 400.0 g of water were added. 15 minutes after the complete addition of the amine solutions 7250.0 g of deionized water were added with vigorous stirring. Under reduced pressure the acetone was distilled off at a liquid-phase temperature of from 40 to 50° C.

This gave a fine dispersion having a solids content of 39.5% by weight, pH=6.5 and a flow time (in accordance with DIN 53 211, 4 mm nozzle) of 16 seconds.

Example 12

800.0 g of polyol 6, 1100.0 g of polyol 5, 1100.0 of polyol 8 and 225.0 g of polyol 4 were dewatered at 120° C. and 15 mbar for 1 hour. At 65° C. 765.0 g of polyisocyanate 4 were added. The mixture was stirred at 75 to 85° C. until a constant isocyanate content of 2.9% was reached. The reaction mixture was diluted with 5000 g of acetone and cooled to 40° C. Added to the solution were 235.0 g of cyclopentanone-2-carboxyethyl ester and 5.0 g of Zn (2-ethyl-)hexanoate. After 3 h at 40 to 50° C. the reaction product was admixed over the course of 5 minutes with 570.0 g of a 30% strength solution of an adduct of 1 mol of acrylic acid and 1 mol of 1-amino-3,3,5-trimethyl-5-aminomethylcyclohexane (isophoronediamine) and subsequently 41.0 g of triethylamine in 400.0 g of water were added. 15 minutes after the complete addition of the amine solutions 5150.0 g of deionized water were added with vigorous stirring. Under reduced pressure the acetone was distilled off at a liquid-phase temperature of from 40 to 50° C.

This gave a fine dispersion having a solids content of 44.5% by weight, pH=6.9 and a flow time (in accordance with DIN 53 211, 4 mm nozzle) of 55 seconds.

Example 13

275.4 g of polyol 2 and 12.2 g of polyol 4 were dewatered at 120° C. and 15 mbar for 1 hour. 65° C. 31.0 g of polyisocyanate 2 and 41.0 g of polyisocyanate 1 were added. The mixture was stirred at 105° C. until a constant isocyanate content of 4.3% was reached. The reaction mixture was diluted with 374.2 g of acetone and cooled to 50° C. Subsequently a solution of 4.5 g of hydrazine hydrate, 9.2 g of isophoronediaminine and 79.8 g of acetone was metered in over the course of 10 minutes. Following the addition of 11.4 g of amine 2 over the course of 5 minutes stirring was continued for 5 minutes and then 0.4 g of zinc 2-ethylhexanoate and 27.8 g of cyclopentanone-2-carboxyethyl ester were added. After a subsequent stirring phase of 5 minutes 598.9 g of deionized water were added with vigorous stirring. Under reduced pressure the acetone was distilled off at a liquid-phase temperature of from 40 to 50° C.

This gave a fine dispersion having a solids content of 40.0% by weight and a pH of 6.4.

Examples 11–13 demonstrate the applicability of the process to polyurethane dispersions in acetone.

Example 14

126.9 g of polyol 6, 25.2 g of polyol 7 and 85.1 g of polyol 4 were dewatered at 120° C. and 15 mbar for 1 hour. At 70° C. 98.6 g of polyisocyanate 3 were added. The mixture was stirred at 100° C. for 45 minutes. After it had cooled to 65° C., 5.1 g of trimethylolpropane, 0.25 g of zinc 2-ethylhexanoate and 20.3 g of cyclopentanone-2-carboxyethyl ester were until a constant isocyanate content of 2.7% was reached. The reaction mixture was subsequently cooled to 60° C. and dispersed by addition of 517.4 g of deionized water over the course of 10 minutes. Chain extension was carried out by adding a solution of 1.7 g of hydrazine hydrate, 11.4 g of isophoronediaminine and 175.9 g of deionized water over the course of 2 minutes.

After a subsequent stirring phase of 3 h a fine dispersion having a solids content of 33.2% by weight and a pH of =5.51 was obtained.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. Hydrophilic polyurethane (PU) prepolymers comprising a polymer backbone with structural units of formula (I),

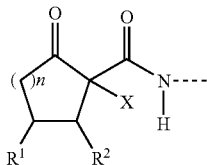

(I)

in which
R$^1$ and R$^2$ independently of one another represent the radicals H, C$_1$–C$_{20}$-(cyclo)alkyl, C$_6$–C$_{24}$-aryl, C$_1$–C$_{20}$-(cyclo)alkyl ester or amide, C$_6$–C$_{24}$-aryl ester or amide, mixed aliphatic/aromatic radicals having 1 to 24 carbon atoms, which may also be part of a 4- to 8-membered ring, and
X is an electron-withdrawing group,
n is an integer from 0 to 5,
and also having structural units of polymeric polyols with a number average molecular weight range from 400 to 6000, the polymer backbone possessing ionic or potentially ionic and/or nonionically hydrophilizing groups.

2. Aqueous dispersions of polyurethane-polyurea polymers comprising the general structural unit (II),

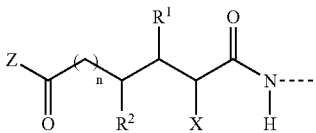

(II)

in which
R$^1$ and R$^2$ independently of one another represent the radicals H, C$_1$–C$_{20}$-(cyclo)alkyl, C$_6$–C$_{24}$-aryl, C$_1$–C$_{20}$-(cyclo)alkyl ester or amide, C$_6$–C$_{24}$-aryl ester or amide, mixed
aliphatic/aromatic radicals having 1 to 24 carbon atoms, which may also be part of a 4- to 8-membered ring,
X is an electron-withdrawing group,
Z represents OH, OR$^3$ or NR$^4$R$^5$, with
R$^3$ is selected from a C$_1$–C$_{20}$-(cyclo)alkyl radical, C$_2$–C$_{18}$-alkenyl radical, C$_5$–C$_8$-cycloalkenyl radical, C$_2$–C$_{18}$-alkynyl radical, C$_6$–C$_{24}$-aryl radical, C$_1$–C$_{20}$-(cyclo)alkyl ester and amide radical, C$_6$–C$_{24}$-aryl ester and amide radical, and C$_3$–C$_{12}$-heterocycloalkyl radicals, all of which can be unsubstituted or substituted by a group selected from NO$_2$, amino, cyano, carboxyl, ester, keto and aldehyde groups,
R$^4$ and R$^5$ are independently of one another radicals selected from the group consisting of H, C$_1$–C$_{20}$-(cyclo)alkyl, C$_2$–C$_{18}$-alkenyl, C$_5$–C$_8$-cycloalkenyl, C$_2$–C$_{18}$-alkynyl, C$_6$–C$_{24}$-aryl, C$_1$–C$_{20}$-(cyclo)alkyl ester and amide, C$_6$–C$_{24}$-aryl ester and amide, C$_3$–C$_{12}$-heterocyclo-alkyl radicals, all of which may be unsubstituted or substituted by a group selected from NO$_2$, amino, cyano, carboxyl, ester, keto and aldehyde groups, and R$^4$ and R$^5$ together with the nitrogen atom may form a C$_3$–C$_{12}$-cycloalkyl or a C$_3$–C$_{13}$-heterocycloalkyl radical containing O, S or N atoms,
and/or the general structural unit (III),

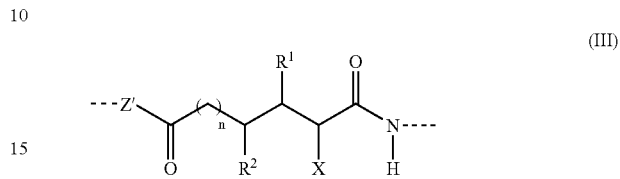

(III)

in which
R$^1$, R$^2$ and X have the aforementioned meaning and
Z' represents a bridging oxygen atom or bridging secondary or tertiary nitrogen atom and
n is an integer from 0 to 5.

3. A process for preparing the polyurethane prepolymers according to claim 1, characterized in comprising the step of reacting
A1) at least one polyisocyanate having aliphatically, cycloaliphatically, araliphatically and/or aromatically attached isocyanate groups with
A2) polymeric polyols of the average molar weight range from 400 to 6000,
A3) optionally one or more polyhydric alcohols having 1 to 4 hydroxyl groups of the molecular weight range up to 400,
A4) at least one ionic and/or potentially ionic and/or nonionic hydrophilic compound having NCO reactive groups,
A5) at least one CH-acidic cyclic ketone of the general formula (IV),

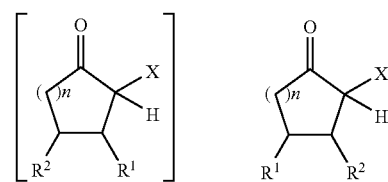

(IV)

in which
X is an electron-withdrawing group,
R$^1$ and R$^2$ independently of one another are selected from the group of radicals consisting of H, C$_1$–C$_{20}$-(cyclo)alkyl, C$_6$–C$_{24}$-aryl, C$_1$–C$_{20}$-(cyclo)alkyl ester and amide, C$_6$–C$_{24}$-aryl ester and amide, mixed aliphatic/aromatic radicals having 1 to 24 carbon atoms, which can also be part of a 4- to 8-membered ring,
n is an integer from 0 to 5, and with
A6) optionally one or more (cyclo)aliphatic monoamines or polyamines or amino alcohols having 1 to 4 amino groups of the molecular weight range up to 400,
in the presence of a catalyst and optionally in the presence of isocyanate-inert organic solvents, the molar ratio of isocyanate groups to isocyanate-reactive groups being from 0.5 to 3.

4. The process according to claim 3, wherein the polymeric polyols (A2) are polyester-, polyether- or polycarbonate polyols.

5. The process according to claim 4, wherein the polyether polyols are composed of less than 30 mol % ethylene oxide units.

6. A process for preparing aqueous dispersions of polyurethane-polyurea polymers according to claim 2 comprising the steps of:
   (a) providing an aqueous phase,
   (b) providing at least one hydrophilic polyurethane prepolymer,
   (c) partly or fully neutralizing ionic or potentially ionic groups, and
   (d) conducting a dispersion operation, by transferring the polyurethane prepolymers of b) to the aqueous phase, or vice versa
   (e) before, simultaneously or after step (d) chain extending with aminic components comprising ionic or potentially ionic and/or nonionic hydrophilic compounds having isocyanate-reactive groups and/or one or more (cyclo)aliphatic monoamines or polyamines or amino alcohols having 1 to 4 amino groups of the molecular weight range up to 400,
   wherein the polyurethane prepolymers of (b) comprise a polymer backbone with structural units of the formula (I)

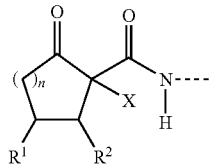
(I)

in which $R^1$ and $R^2$ independently of one another represent a radical selected from the group consisting of H, $C_1$–$C_{20}$-(cyclo)alkyl, $C_6$–$C_{24}$-aryl, $C_1$–$C_{20}$-(cyclo)alkyl ester and amide, $C_6$–$C_{24}$-aryl ester and amide, mixed aliphatic/aromatic radicals having 1 to 24 carbon atoms, which may also be part of a 4- to 8-membered ring, and X is an electron-withdrawing group, n is an integer from 0 to 5, and also having structural units of polymeric polyols with a number average molar weight range of from 400 to 6000, the polymer backbone possessing ionic or potentially ionic and/or nonionic hydrophilizing groups.

7. A process for producing coating compositions comprising adding the aqueous dispersions of polyurethane-polyurea polymers according to claim 2 alone or in combination with curing agents and/or polymers soluble, emulsifiable or dispersible in water and in dispersed form to a coating composition.

8. Coating compositions comprising polyurethane-polyurea dispersions according to claim 2.

9. Substrates coated with the coating compositions comprising polyurethane-polyurea dispersions according to claim 8.

10. A method of preparing coating materials, sizes or adhesives comprising adding the polyurethane prepolymers of claim 1 to a composition selected from coating compositions, sizing compositions and adhesive compositions.

11. A method of preparing coating materials, sizes or adhesives comprising adding the polyurethane polyurea dispersions of claim 2 to a composition selected from coating compositions, sizing compositions and adhesive compositions.

* * * * *